United States Patent
Kageyama et al.

(10) Patent No.: US 7,642,687 B2
(45) Date of Patent: *Jan. 5, 2010

(54) SHORT-CIRCUIT MEMBER FOR A COMMUTATOR AND AN ARMATURE

(75) Inventors: Ryohei Kageyama, Hamamatsu (JP); Toshio Yamamoto, Kosai (JP)

(73) Assignee: Asmo Co., Ltd., Shizuoka-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/118,489

(22) Filed: May 9, 2008

(65) Prior Publication Data

US 2008/0293310 A1 Nov. 27, 2008

(30) Foreign Application Priority Data

May 11, 2007 (JP) .............................. 2007-126456
Jan. 28, 2008 (JP) .............................. 2008-016494

(51) Int. Cl.
H01R 39/46 (2006.01)
(52) U.S. Cl. ...................................... 310/220; 439/507
(58) Field of Classification Search ................. 439/507, 439/509; 310/220, 221, 22, 204, 233–236
See application file for complete search history.

(56) References Cited

U.S. PATENT DOCUMENTS 7,414,344 B2 * 8/2008 Kageyama et al. .......... 310/233
2007/0069603 A1 * 3/2007 Terada et al. ................. 310/234
2007/0096582 A1 * 5/2007 Kageyama et al. .......... 310/204
2007/0152531 A1 * 7/2007 Santo et al. ................. 310/233
2008/0265708 A1 * 10/2008 Aoyama et al. ............. 310/236
2009/0001832 A1 * 1/2009 Ishihara et al. .............. 310/128

FOREIGN PATENT DOCUMENTS

JP 2005-137193 A 5/2005
JP 2007-252037 A 9/2007

* cited by examiner

*Primary Examiner*—Michael C Zarroli
*Assistant Examiner*—Harshad C Patel
(74) *Attorney, Agent, or Firm*—Novak Druce+Quigg; J. Rodman Steele, Jr.; Gregory M. Lefkowitz

(57) ABSTRACT

The number of conductor members in a first conductor member group and the number of conductor members in a second conductor member group are equal to each other and are odd numbers. An inner terminal of each conductor member is displaced from an outer terminal of the same conductor member by 90 degrees with respect to the circumferential direction of the corresponding conductor member group. Each outer terminal of the first conductor member group is displaced from a corresponding one of the outer terminals of the second conductor member with respect to the circumferential direction of the first conductor member group.

12 Claims, 10 Drawing Sheets

SHORT-CIRCUIT MEMBER FOR A COMMUTATOR AND AN ARMATURE

BACKGROUND OF THE INVENTION

The present invention relates to a short-circuit member that short-circuits predetermined segments to each other so that they have the same potential, a commutator having the short-circuit member, an armature having the commutator, and a method for manufacturing the short-circuit member.

In a motor such as a direct-current motor having a commutator and feeding brushes sliding against the commutator, a current is supplied to armature coils of an armature through the feeding brushes and the commutator. The commutator has a number of segments, and predetermined ones of the segments are short-circuited by a short circuit member. By short-circuiting the predetermined segments, a current is supplied to segments that are not contacting the feeding brushes. The number of feeding brushes can be reduced.

For example, Japanese Laid-open Patent Publication No. 2005-137193 discloses a short-circuit member that is formed by stacking a first conductor member group and a second conductor member group. Each of the first and second conductor member group includes conductor members the number of which is equal to the number of the segments of the commutator. The conductor members in each conductor member group are arranged to form a circle. Each conductor member has an outer terminal located at an outer portion with respect to the radial direction of the corresponding conductor member group, an inner terminal located at an inner portion with respect to the radial direction of the corresponding conductor member group, and a coupling portion coupling the outer terminal and the inner terminal to each other. A hook portion extending radially outward of the corresponding conductor member group is formed in the outer terminal of each conductor member. The first conductor member group and the second conductor member group are stacked on each other such that the outer terminals of the first conductor member group and the outer terminals of the second conductor member group are aligned and the inner terminals of the first conductor member group and the inner terminals of the second conductor member group are aligned. The aligned outer terminals are joined, and the aligned inner terminals are joined, so that the first and second conductor member groups are integrated. The hook portions of the outer terminals of the integrated first and second conductor member groups are connected to the corresponding segments. Some of the hook portions are engaged with end portions of the corresponding armature coils.

In the short-circuit member of the above described publication, each outer terminal of the first conductor member group is joined with the corresponding one of the outer terminals of the second conductor member group, and each inner terminal of the first conductor ember group is joined with the corresponding one of the inner terminals of the second conductor member group. In other words, joining is required at a number of positions. This complicates the operation for integrating the first conductor member group and the second conductor member group.

SUMMARY OF THE INVENTION

Accordingly, it is an objective of the present invention to provide a short-circuit member that simplifies an operation for integrating a first conductor member group and a second conductor member group, a commutator having the short-circuit member, an armature having the commutator, and a method for manufacturing the short-circuit member.

To achieve the foregoing objective and in accordance with a first aspect of the present invention, a short-circuit member including a first conductor member group and a second conductor member group is provided. Each conductor member group includes a plurality of conductor members that are arranged to form a circle. The number of the conductor members belonging to the first conductor member group and the number of the conductor members belonging to the second conductor member group are equal to each other and represented by n, which is an odd number. Each conductor member has an outer terminal located at an outer portion with respect to a radial direction of the corresponding conductor member group, an inner terminal located at an inner; portion with respect to the radial direction of the corresponding conductor member group, and a coupling portion coupling the outer terminal and the inner terminal to each other. The inner terminal of each conductor member is displaced from the outer terminal of the same conductor member by 90 degrees with respect to a circumferential direction of the corresponding conductor member group. The first conductor member group and the second conductor member group are stacked on each other such that the direction in which the inner terminal is displaced from the outer terminal in each conductor member of the first conductor member group is opposite to the direction in which the inner terminal is displaced from the outer terminal in each conductor member of the second conductor member. Each inner terminal of the first conductor member group is aligned with a corresponding one of the inner terminals of the second conductor member group. Each outer terminal of the first conductor member group is displaced from a corresponding one of the outer terminals of the second conductor member with respect to the circumferential direction of the first conductor member group.

In accordance with a second aspect of the present invention, a short-circuit member including a first conductor member group and a second conductor member group is provided. Each conductor member group includes a plurality of conductor members that are arranged to form a circle. The number of the conductor members belonging to the first conductor member group and the number of the conductor members belonging to the second conductor member group are equal to each other and represented by n, which is an odd number. Each conductor member has an outer terminal located at an outer portion with respect to a radial direction of the corresponding conductor member group, an inner terminal located at an inner portion with respect to the radial direction of the corresponding conductor member group, and a coupling portion coupling the outer terminal and the inner terminal to each other. The inner terminal of each conductor member is displaced from the outer terminal of the conductor member with respect to a circumferential direction of the corresponding conductor member group. The first conductor member group and the second conductor member group are stacked on each other such that the direction in which the inner terminal is displaced from the outer terminal in each conductor member of the first conductor member group is opposite to the direction in which the inner terminal is displaced from the outer terminal in each conductor member of the second conductor member. Each inner terminal of the first conductor member group is aligned with a corresponding one of the inner terminals of the second conductor member group. Each outer terminal of the first conductor member group is displaced from a corresponding one of the outer terminals of the second conductor member with respect to the circumferential direction of the first conductor member group. Regarding each pair of a conductor member of the first conductor member group and a conductor member of the second conductor member group, of which the inner terminals are aligned with each other, the linear distance between the inner terminal and the outer terminal of one of the conductor members is equal to that of the other of the conductor members.

In accordance with a third aspect of the present invention, a commutator including segments and a short circuit member. The number of the segments is represented by 2n, n being a positive integer. The short-circuit member has a first conductor member group and a second conductor member group. Each conductor member group includes a plurality of conductor members that are arranged to form a circle. The number of the conductor members belonging to the first conductor member group and the number of the conductor members belonging to the second conductor member group are equal to each other and represented by n, which is an odd number. Each conductor member has an outer terminal located at an outer portion with respect to a radial direction of the corresponding conductor member group, an inner terminal located at an inner portion with respect to the radial direction of the corresponding conductor member group, and a coupling portion coupling the outer terminal and the inner terminal to each other. The inner terminal of each conductor member is displaced from the outer terminal of the same conductor member by 90 degrees with respect to a circumferential direction of the corresponding conductor member group. The outer terminal of each conductor member is connected to the corresponding one of the segments. The first conductor member group and the second conductor member group are stacked on each other such that the direction in which the inner terminal is displaced from the outer terminal in each conductor member of the first conductor member group is opposite to the direction in which the inner terminal is displaced from the outer terminal in each conductor member of the second conductor member. Each inner terminal of the first conductor member group is aligned with a corresponding one of the inner terminals of the second conductor member group. Each outer terminal of the first conductor member group is displaced from a corresponding one of the outer terminals of the second conductor member with respect to the circumferential direction of the first conductor member group.

In accordance with a fourth aspect of the present invention, an armature including a rotary shaft, an armature core, and the commutator of the third, aspect of the present invention is provided. The armature core is fixed about the rotary shaft, and a coil is wound about the armature core. The commutator is fixed about the rotary shaft, and the segments of the commutator are electrically connected to the coil;

In accordance with fifth aspect of the present invention, a method for manufacturing the short-circuit member according to the first aspect of the present invention is provided. The method includes: forming on each of two conductive plates a conductor member group formed of annularly arranged conductor members, the conductor members in the conductor member group formed on each conductive plate being connected one another by an outer frame and an inner frame. The forming the conductor group includes: punching through pressing annularly arranged outer holes and annularly arranged inner holes, the numbers of which are equal to each other, on each plate, whereby an outer terminal is formed between each adjacent pair of the outer holes in a circumferential direction of the outer holes, and an inner terminal is formed between each adjacent pair of the inner holes in a circumferential direction of the inner holes; and forming through pressing cutting lines the number of which is the equal to the numbers of the outer holes and the inner holes, the cutting lines being located in a part of each plate located between the outer holes and the inner holes, each cutting line extending from one of the outer holes toward the corresponding one of the inner holes, thereby dividing the part of the plate between the outer holes and the inner holes so that coupling portions are formed. The method further includes: bending the coupling portion of each conductor member belonging to the conductor member group formed on each plate such that a center portion of each coupling portion bulges in a direction of the thickness of the plate, the bending of the coupling portions causes a circumferentially adjacent coupling portions to be separate from each other; stacking the plates onto each other after bending, such that the direction in which the center portion of each coupling portion of one of the plates bulges and the direction in which the center portion of each coupling portion of the other plate bulges are opposite to each other, wherein, in the stacked plates, the inner terminals of one of the plates are aligned with the inner terminals of the other plate, and the outer terminals of one of the plates are displaced from the outer terminals of the other plate; and removing the outer frame and the inner frame of each plate after the stacking of the plates.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of the present invention will now be described with reference to the drawings.

Figure 1:
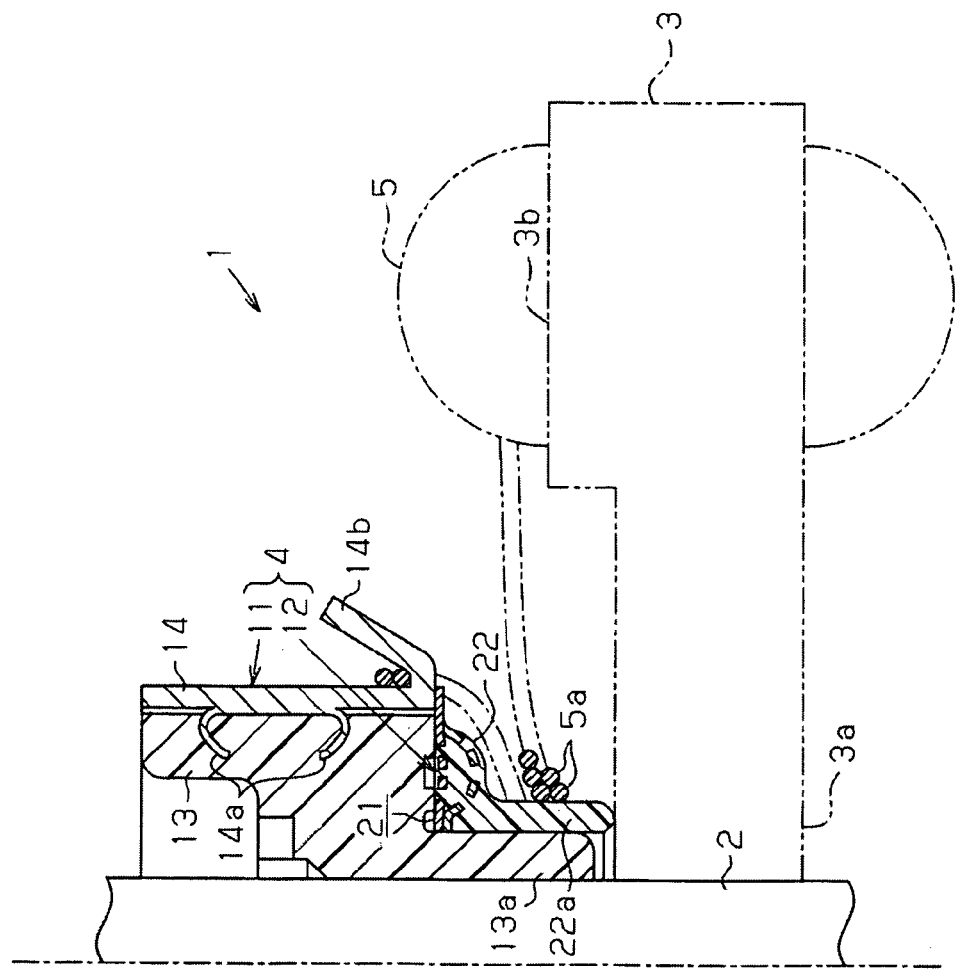
FIG. 1 is a cross-sectional view of an armature according to a first embodiment of the present invention taken along a center axis of the armature, showing one of the halves divided at the center axis.

An armature 1 shown in FIG. 1 is arranged inside of a stator (not shown), and form a motor together with the stator. The stator has permanent magnets that are arranged along the circumferential direction of the armature 1.

The armature 1 includes a metal rotary shaft 2, an armature core 3, a commutator 4, and coils 5 wound about the armature core 3. The armature core 3 and the commutator 4 are fixed to the periphery of the rotary shaft 2. Both ends of the rotary shaft 2 are rotatably supported by the stator.

The armature core 3 includes an annular fixing portion 3a and teeth 3b extending radially outward from the outer periphery of the fixing portion 3a. The fixing portion 3a has a hole through which the rotary shaft 2 extends. The coils 5 are wound about the teeth 3b.

The commutator 4 includes a commutator main body 11 fixed to the rotary shaft 2 and a short-circuit member 12 arranged at one end of the commutator main body 11. The commutator main body 11 includes an insulation member 13 contacting the rotary shaft 2 and fourteen segments 14 located on the outer periphery of the insulation member 13. The insulation member 13 is made of, for example, an insulating thermosetting resin and is substantially cylindrical. One end of the insulation member 13 (the lower end as viewed in FIG. 1) forms a joining portion 13a of a small diameter. The rotary shaft 2 is press fitted to the inside of the joining portion 13a so that the insulation member 13 is fixed to the rotary shaft 12. The insulation member 13 thus rotates integrally with the rotary shaft 12.

Figure 2:
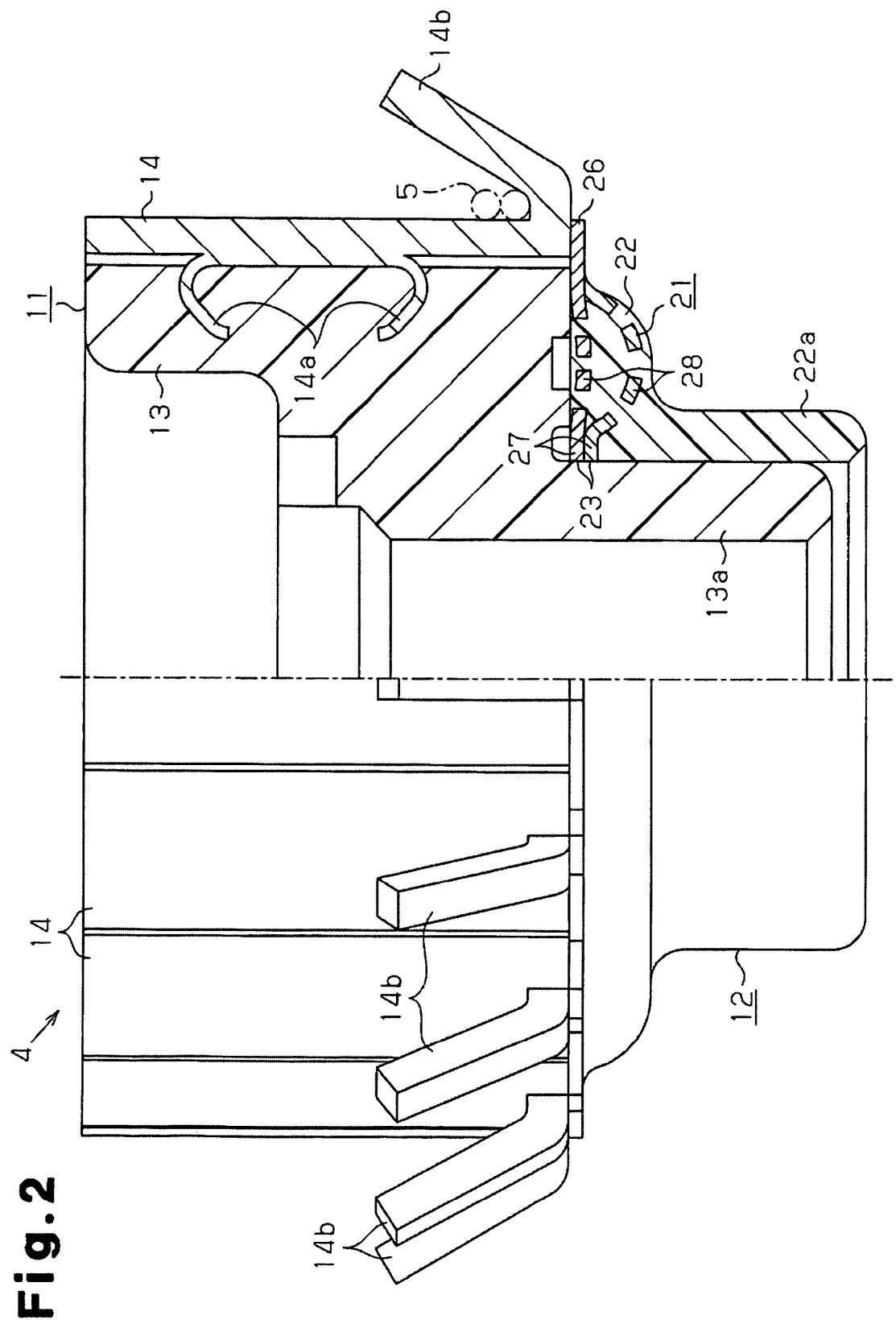
FIG. 2 is a half cross-sectional view showing a commutator of the armature shown in FIG. 1.

As shown in FIG. 2, the segments 14 are arranged on the outer circumferential surface of the insulation member 13 at equal angular intervals. Each segments 14 has an elongated shape along the axial direction of the commutator 4. A pair of holding claws 14a extend from the inner surface of each segment 14. The holding claws 14a are curved such that each pair approach each other toward the distal ends. Each segment 14 is held by the insulation member 13 by embedding the holding claws 14a into the insulation member 13. Each segment 14 has a riser 14b, with which an end of the corresponding coil 5 is engaged. Each riser 14b extends from the outer surface of one end of the corresponding segment 14 (the outer surface of the lower end in FIG. 2), and forms an acute angle with the outer surface of the segment 14. A plurality of non-illustrated feeding brushes slide against the commutator main body 11, which is formed by the insulation member 13 and the segments 14 as described above, from radially outward positions.

The short-circuit member 12 includes a conductor bar assembly (conductor member assembly) 21 and a holding member 22. The conductor bar assembly 21 short-circuits each pair of the segments 14 that are spaced by 180 degrees along the circumferential direction of the commutator 4. The holding member 22 holds the conductor bar assembly 21.

Figure 3:
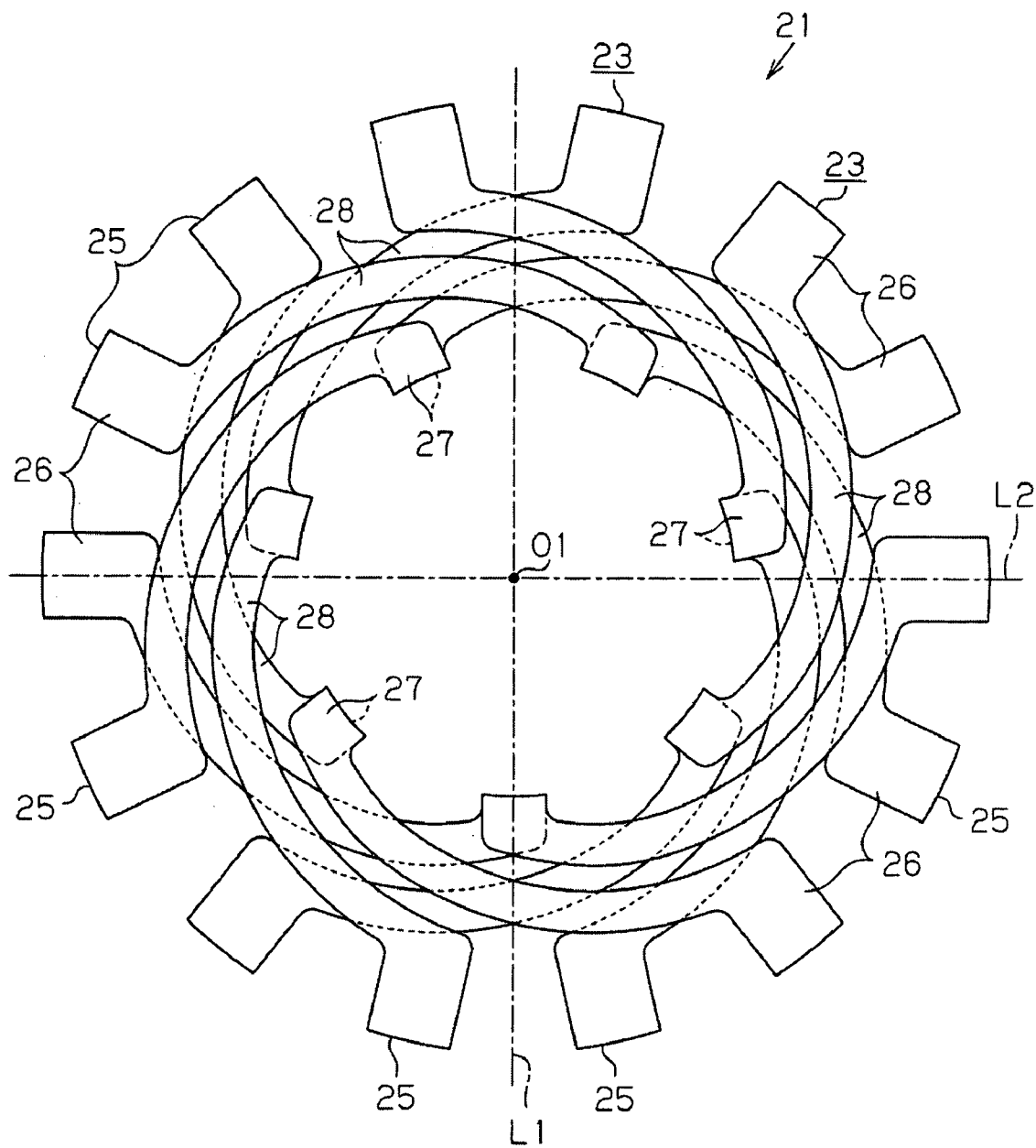
FIG. 3 is a plan view showing a conductor bar assembly of the armature shown in FIG. 1.

As shown in FIG. 3, the conductor bar assembly 21 is formed by stacking a first conductor bar group (first conductor member group) 23 and a second conductor bar group (second conductor member group) 23. Each of the conductor bar groups 23 includes seven conductor bars (conductor members) 25. When viewed along the center axis of the corresponding conductor bar group 23, the first conductor bar group 23 and the second conductor bar group 23 have identical but inverted shapes.

Figure 4:
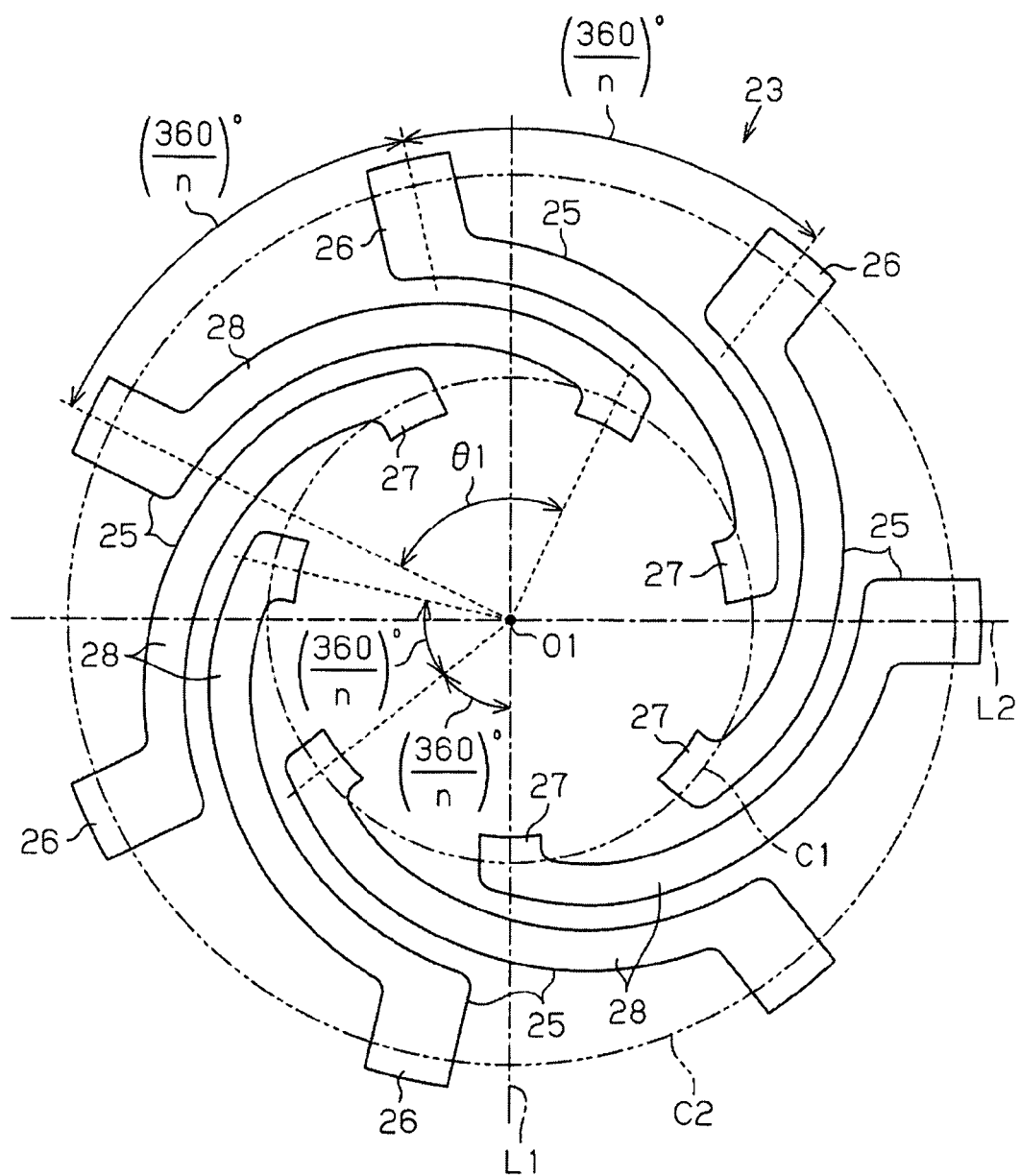
FIG. 4 is a plan view showing a conductor bar group of the armature shown in FIG. 1.

As shown in FIG. 4, the seven conductor bars 25 of each conductor bar group 23 are arranged to form a circle. Each conductor bar 25 has an outer terminal 26, an inner terminal 27, and a coupling portion 28 that couples the outer terminal 26 and the inner terminal 27 to each other. The outer terminals 26 are located outside of the inner terminals 27 with respect to the radial direction of the corresponding conductor bar group 23. The inner terminals 27 are located inside of the outer terminals 26 with respect to the radial direction of the corresponding conductor bar group 23. Each inner terminal 27 is displaced from the outer terminal 26 of the associated conductor bar 25 by a predetermined angle θ1 with respect to the circumferential direction of the corresponding conductor bar group 23, specifically, by 90 degrees. Each coupling portion 28 is curved to form an involute curve when viewed along the center axis of the corresponding conductor bar group 23. A space having a substantially constant width exists between the coupling portions 28 of each pair of the conductor bars 25 that are adjacent to each other with respect to the circumferential direction of the corresponding conductor bar group 23.

A small imaginary circle C1 in FIG. 4 is formed by connecting positions at which the inner terminals 27 of each conductor bar group 23 are arranged. A large imaginary circle C2 in FIG. 4 is formed by connecting positions at which the outer terminals 26 of each conductor bar group 23 are arranged. A first imaginary straight line L1 extends in the longitudinal direction in FIG. 4 and includes a center 01 common to the small circle C1 and the large circle C2. A second imaginary straight line L2 extends in the lateral direction in FIG. 4 and includes the center 01. The straight lines L1 and L2 are perpendicular to each other.

When the number of the segments 14 of the commutator 4, which is fourteen, is expressed as 2n, n represents seven, which is an odd number. The value of n is equal to the number of the outer terminals 26 of each conductor bar group 23 and to the number of the inner terminals 27 of each conductor bar group 23.

The inner terminals 27, the number of which is represented by n, of each conductor bar group 23 are arranged on the small circle C1 at equal angular intervals. At this time, one of the inner terminals 27 is located on the first straight line L1. The angular interval between each adjacent pair of the inner terminals 27 along the circumferential direction of the small circle C1 is $(360/n)°$. Each of the inner terminals 27 except for the inner terminal 27 that is located on the first straight line L1 is axisymmetric with the corresponding one of the inner terminals 27 with respect to the first straight line L1.

The outer terminals 26, the number of which is represented by n, of each conductor bar group 23 are arranged on the large circle C2 at equal angular intervals. At this time, one of the outer terminals 26 is located on the second straight line L2. The angular interval between each adjacent pair of the outer terminals 26 along the circumferential direction of the large circle C1 is $(360/n)°$. Each of the outer terminals 26 except for the cut terminal 26 that is located on the second straight line L2 is axisymmetric with the corresponding one of the outer terminals 26 with respect to the second straight line L2.

Each outer terminal 26 is connected by the corresponding coupling portion 28 to one of the inner terminals 27 that is displaced by 90 degrees from the outer terminal 26 with respect to the circumferential direction of the corresponding conductor bar group 23. This is as if the inner terminal 27 on the first straight line L1 and the outer terminal 26 on the second straight line L2 are first coupled to each other by the corresponding coupling portion 28, and thereafter, the outer terminal 26 and the inner terminal 27 that are located adjacent to the previously coupled outer and inner terminals 26, 27 are coupled to a coupling portion 28, consecutively.

Referring back to FIG. 3, the first conductor bar group 23 and the second conductor bar group 23 are stacked on each other after one of the first and second conductor bar groups 23 is inverted about the first straight line L1. The stacking is executed such that each of the inner terminals 27 of the first conductor bar group 23 is aligned with the corresponding one of the inner terminals 27 of the second conductor bar group 23, and that each of the outer terminals 26 of the first conductor bar group 23 is displaced from the corresponding one of the outer terminals 26 of the second conductor bar group 23 with respect to the circumferential direction of the corresponding conductor bar group 23. In the conductor bar assembly 21, which is obtained by stacking the first and second conductor bar groups 23, fourteen outer terminals 26 are arranged at equal angular intervals along the circumferential direction of the conductor bar assembly 21. Also, the direction in which the inner terminal 27 is displaced from the outer terminal 26 in each conductor bar 25 in the first conductor bar group 23 is opposite to the direction in which the inner terminals 27 is displaced from the outer terminal 26 in each conductor bar 25 in the second conductor bar group 23. Further, regarding each pair of a conductor bar 25 of the first conductor bar group 23 and a conductor bar 25 of the second conductor bar group 23, of which the inner terminals 27 are aligned with each other, the linear distance between the inner terminal 27 and the outer terminal 26 of one of the conductor bars 25 is equal to that of the other of the conductor bars 25.

As shown in FIG. 2, each coupling portion 28 of the first conductor bar group 23 or each coupling portion 28 of the second conductor bar group 23 is bent such that its center portion in the longitudinal direction bulges by a relatively great amount in the axial direction of the conductor bar assembly 21, and each coupling portion 28 of the other conductor bar group 23 is bent such that its center portion in the longitudinal direction bulges by a relatively small amount in the axial direction of the conductor bar assembly 21. Therefore, the coupling portions 28 of the first conductor bar group 23 and the coupling portions 28 of the second conductor bar group 23 have three-dimensional shapes. The direction in which the center portions of the coupling portions 28 with greatly bulging center portion bulge is a direction away from the conductor bar group 23 that is different from the conductor bar group 23 to which the coupling portions 28 of the greatly bulging center portions belong. The direction in which the center portions of the coupling portions 28 with slightly bulging center portion bulge is a direction toward the conductor bar group 23 that is different from the conductor bar group 23 to which the coupling portions 28 of the slightly bulging center portions belong.

Each aligned pair of the inner terminals 27 of the first conductor bar group 23 and the inner terminals 27 of the second conductor bar group 23 are joined to each other through welding. On the other hand, the outer terminals 26 of the first conductor bar group 23 and the outer terminals 26 of the second conductor bar group 23 are not joined to each other. Thus, the conductor bar assembly 21 only has seven joined positions. As shown in FIG. 3, in the conductor bar assembly 21, the outer terminals 26 of each pair of conductor bars 25 the inner terminals 27 of which are joined/to each other are spaced by 180 degrees along the circumferential direction of the conductor bar assembly 21.

As shown in FIG. 2, the holding member 22, which holds the conductor bar assembly 21, is formed of a material different from that of the insulation member 13. The holding member 22 is made of, for example, an insulating thermoplastic resin and is substantially annular. A portion of the conductor bar assembly 21 except for the outer terminals 26 is embedded in the holding member 22 so that the conductor bar assembly 21 is held by the holding member 22. The resin forming the holding member 22 fills not only the space between the coupling portions 28 of the first conductor bar group 23 and the coupling portions 2B of the second conductor bar group 23, but also the space between each circumferentially adjacent pair of the conductor bars 25 (see FIG. 3). A cylindrical boss 22a extends from a neuter of the holding member 22. The inner diameter of the boss 22a is equal to or slightly smaller than the outer diameter of the joining portion 13a of the insulation member 13. The joining portion 13a is press fitted to the boss 22a, so that the short-circuit member 12 is attached and fixed to the commutator main body 11. In the state where the short-circuit member 12 is attached to the commutator main body 11, each outer terminal 26 contacts one end of the corresponding segment 14 (the lower end as viewed in FIG. 2). Contacting parts of the outer terminals 26 and the segments 14 are welded to each other so as to be electrically conducted to each other. Accordingly, each pair of the segments 14 that are spaced by 180 degrees along the circumferential direction of the commutator 4 are short-circuited and maintained at a same potential.

As shown in FIG. 1, the armature core 3 and the commutator 4 are arranged along the axial direction of the rotary shaft 2 and fixed about the rotary shaft 2. The distal end of the boss 22a of the commutator 4 contacts the armature core 3. The boss 22a supports an end of each, coil 5 that is routed from the riser 14b of each segment 14 to a tooth 3b of the armature core 3. This supported end of each coil 5 will hereafter be referred to as a connecting wire 5a. That is, the boss 22a prevents the connecting wires 5a from contacting the rotary shaft 2, and also prevents the connecting wires 5a from being bent by a small bending radius.

A method for manufacturing the short-circuit member 12 will now be described.

Figure 5A:
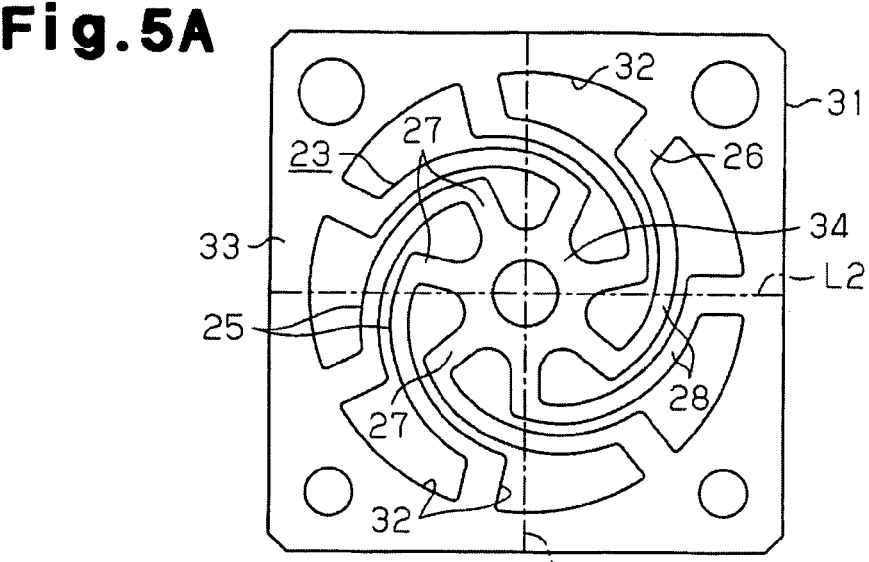
FIGS. 5A, 5B, and 5C are diagrams showing manufacturing procedure of the conductor bar assembly shown in FIG. 3.

First, as shown in FIG. 5A, each of two conductive plates 31 such as copper plates is pressed to punch annularly arranged seven slits 32. This forms seven conductor bars 25 each located between an adjacent pair of the slits 32 of each plate 31. The conductor bars 25 formed in each plate 31 are connected by an outer frame 33 and an inner frame 34. In the present embodiment, the coupling portion 28 of each conductor bars 25 is bent such that its longitudinal center portion bulges along the direction of the thickness of the corresponding plate 31 at the same time as punching.

Figure 5B:
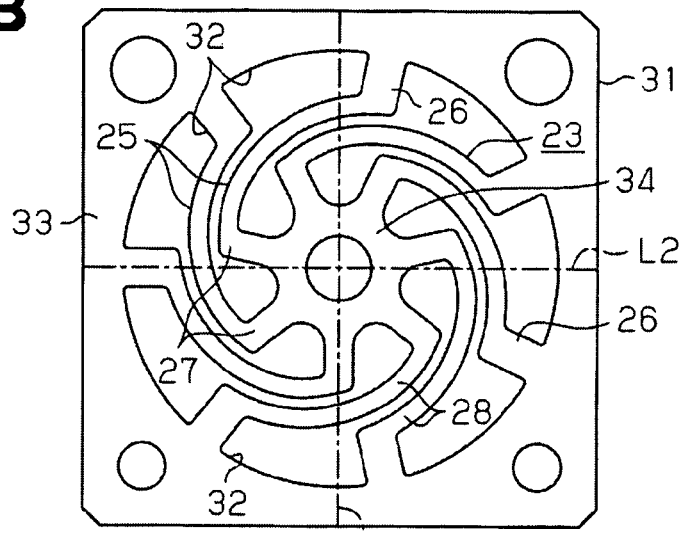
Figure 5C:
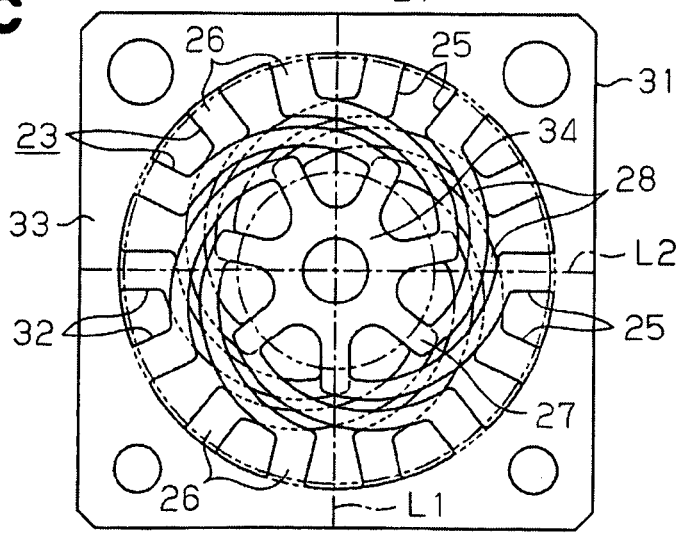

Next, the pressed two plates 31 are stacked as shown in FIG. 5C. Prior to the stacking, one of the two plates 31 is inverted about the first straight line L1 shown in FIG. 5A. FIG. 5B shows the inverted plate 31. Accordingly, when the two plates 31 are stacked, the direction in which the inner terminal 27 is displaced from the outer terminal 26 of each conductor bar 25 in one plate 31 is opposite to the direction in which the inner terminal 27 is displaced from the outer terminal 26 of each conductor bar 25 in the other plate 31. Also, the inner terminals 27 of one plate 31 are arranged to be aligned with the inner terminals 27 of the other plate 31, and the outer terminals 26 of one plate 31 are arranged to be displaced from the outer terminals 26 of the other plate 31.

Subsequently, the aligned pairs of the inner terminals 27 of the stacked two plates 31 are joined through welding.

Thereafter, to form the holding member 22, the stacked two plates 31 are placed in a mold (not shown), which is then filled with molten thermoplastic resin. The thermoplastic resin is cooled and solidified, so that the holding member 22, which is integrated with the stacked two plates 31, is completed. After the completion of the holding member 22, the two plates 31, which is integrated with the holding member 22, is removed from the mold.

Finally, the plates 31 are cut along double dashed lines in FIG. 5C to remove the outer frame 33 and the inner frame 34 of each plate 31. The short-circuit member 12 is thus completed.

The first embodiment provides the following advantages.

(1) Each pair of the segments 14 that are spaced by 180 degrees along the circumferential direction of the commutator 4 are short-circuited to each other by two of the conductor bars 25, which are one of the conductor bars 25 in the first conductor bar group 23 and one of the conductor bars 25 in the second conductor bar group 23. Therefore, the number of the conductor bars 25 in each conductor bar group 23 is seven, which is less than that in the prior art. While the inner terminals 27 of the first conductor bar group 23 and the inner terminals 27 of the second conductor bar group 23 are aligned and joined to each other, the outer terminals 26 of the first conductor bar group 23 and the outer terminals 26 of the second conductor bar group 23 are displaced and not joined to each other. When integrating the first conductor bar group 23 and the second conductor bar group 23, the number of parts that require joining is seven, which is less that in the prior art. Therefore, the first conductor bar group 23 and the second conductor bar group 23 are easily integrated, which improves the productivity of the commutator 4 and the armature 1. The small number of the joining parts reduces the incidence of poor joining, and thus increases the reliability of the short-circuit member 12. As a result, the segments 14 that are short-circuited by the short-circuit member 12 are reliably conducted to each other, so that current is reliably supplied to the coils 5 through the commutator 4. Further, since the number of the conductor bars 25 that belong to each conductor bar group 23 is less than that of the prior art, there is no harm in widening the width of the coupling portion 28 of each conductor bar 25. For example, when increasing the width of each coupling portion 28 without changing the value of the electric resistance of the coupling portion 28 (that is, without changing the cross-sectional area along the width of the coupling portion 28), the thickness of the coupling portion 28 does not need to be significantly increased. Thus, plates 31 having relatively small thicknesses can be used for forming the conductor bar groups 23. The thinner the plates 31, the easier and more accurate the punching becomes. Alternatively, when the width of each coupling portion 28 is increased without changing the thickness of the coupling portion 28, the cross-sectional area along the width of the coupling portion 28 is increased. This reduces the electric resistance of the coupling portion 28, and thus improves the conductivity of the connection between the segments 14 that are short-circuited by the short-circuit member 12.

(2) The seven inner terminals 27 of each conductor bar group 23 are arranged at equal angular intervals along the circumferential direction of the conductor bar group 23. That is, the distance between each adjacent pair of the inner terminals 27 with respect to the circumferential direction of the corresponding conductor bar group 23 is constant. This facilitates the joining of the corresponding inner terminals 27 to each other. Also, in addition to the fact that the inner terminals 27 of each conductor bar group 23 are arranged at equal angular intervals along the circumferential direction of the conductor bar group 23, each inner terminal 27 is displaced by 90 degrees with respect to the circumferential direction of the conductor bar group 23 from the outer terminal 26 of the associated conductor bar 25. Therefore, when the first conductor bar group 23 and the second conductor bar group 23 are stacked such that the inner terminals 27 are aligned, the fourteen outer terminals 26 are arranged at equal angular intervals along the circumferential direction of the conductor bar groups 23. This facilitates the operation for connecting the outer terminals 26 to the segments 14, which are arranged at equal angular intervals along the circumferential direction of the commutator 4.

(3) When viewed along the center axis of the corresponding conductor bar group 23, the first conductor bar group 23 and the second conductor bar group 23 have identical shapes. The seven inner terminals 27 of each conductor bar group 23 are arranged at equal angular intervals on the imaginary small circle C1 shown in FIG. 4, such that one of the inner terminals 27 is located on the first imaginary straight line L1 shown in FIG. 4. The seven outer terminals 26 of each conductor bar group 23 are arranged at equal angular intervals on the imaginary large circle C2 shown in FIG. 4, such that one of the outer terminals 26 is located on the second imaginary straight line L2 shown in FIG. 4. Accordingly, while each of the inner terminals 27 except for the inner terminal 27 that is located on the first straight line L1 is axisymmetric with the corresponding one of the inner terminals 27 with respect to the first straight line L1, the outer terminals 26 are not axisymmetric with respect to the first straight line L1. Therefore, when the first conductor bar group 23 and the second conductor bar group 23 are stacked after inverting one of the first conductor bar group 23 and the second conductor bar group 23 about the first straight line L1, each inner terminal 27 of the first conductor bar group 23 is aligned with the corresponding inner terminal 27 of the second conductor bar group 23, and each outer terminal 26 of the first conductor bar group 23 is displaced in the circumferential direction of the conductor bar group 23 from the corresponding outer terminal 26 of the second conductor bar group 23. This facilitates the stacking of the first conductor bar group 23 and the second conductor bar group 23, and thus improves the productivity of the short circuit member 12.

(4) The number of the conductor bars 25 belonging to each conductor bar group 23 is less than that in the prior art. Thus, by increasing the width of the slits 32, which are punched in the plates 31 through pressing, the distance between each adjacent pair of the conductor bars 25 with respect to the circumferential direction of the corresponding conductor bar group 23 is easily made wider than that in the prior art. The wider the slits 32, the easier the punching of the slits 32 becomes. Also, the conductor bars 25 each formed between adjacent slits 32 are prevented from being deformed when the slits 32 are formed. Further, compared to the case where the slits 32 have narrow widths, a mold such as a punch and a die used in pressing is easily produced, and the life of the mold is extended.

(5) Each coupling portion 28 of the first conductor bar group 23 or each coupling portion 28 of the second conductor bar group 23 is bent such that its center portion in the longitudinal direction bulges by a relatively great amount in the axial direction of the corresponding conductor bar group 23. The direction in which the center portions bulge is a direction away from the other conductor bar group 23. Therefore, a sufficiently large space is easily created between each adjacent pair of the coupling portions 28 along the circumferential direction of the corresponding conductor bar group 23 to prevent the coupling portions 28 from being short-circuited, without reducing the width of each coupling portion 28, changing the space between adjacent outer terminals 26 along the circumferential direction of the corresponding conductor bar group 23 or the space between the adjacent inner terminals 27 along the circumferential direction of the corresponding conductor bar group 23, or changing the outer diameter or the inner diameter of each conductor bar group 23. This also prevents the coupling portions 28 of the first conductor bar group 23 and the coupling portions 28 of the second conductor bar group 23 from contacting each other and being short-circuited.

Second Embodiment

A second embodiment of the present invention will now be described with reference to the drawings. The differences from the first embodiment will mainly be discussed below.

Figure 6:
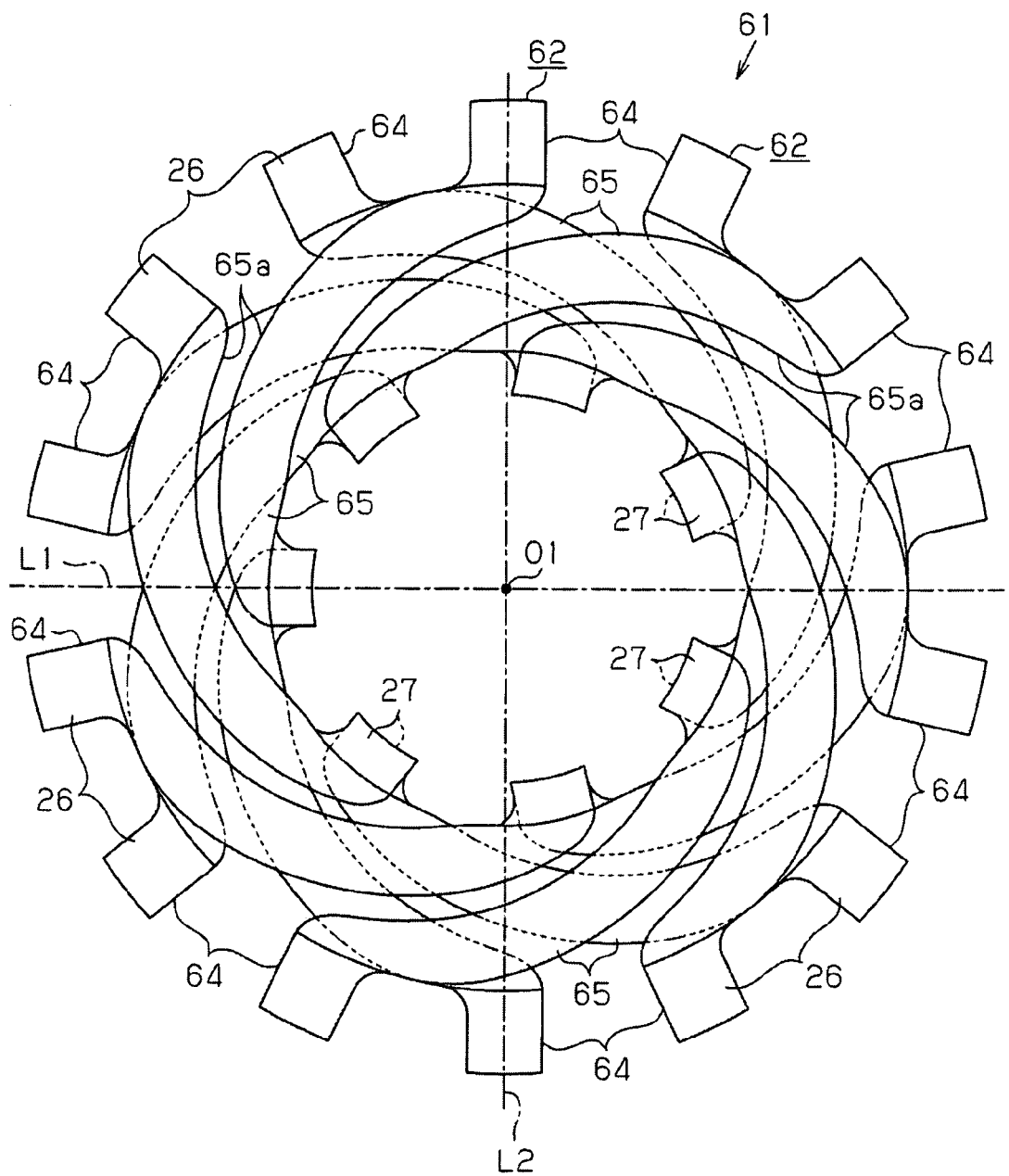
FIG. 6 is a plan view showing a conductor bar assembly according to a second embodiment of the present invention.

Instead of the conductor bar assembly 21 of the first embodiment shown in FIG. 3, the short-circuit member 12 according to the second embodiment is provided with a conductor bar assembly 61 shown in FIG. 6. The conductor bar assembly 61 is formed by stacking a first conductor bar group 62 and a second conductor bar group 62, each having seven conductor bars 64. When viewed along the center axis of the corresponding conductor bar group 62, the first and second conductor bar groups 62 have identical but inverted shapes. Comparing the first and second conductor bar groups 52 shown in FIG. 6 and the first and second conductor bar groups 23 shown in FIG. 3, the shape, of a coupling portion 65 that couples the outer terminal 26 to the inner terminal 27 of each of the conductor bars 64 belonging to the conductive bar groups 62 is different from that of the coupling portion 28 of each of the conductor bars 25 belonging to the conductor bar groups 23.

The seven conductor bars 64 of each conductor bar group 62 are arranged to form a circle. Like the case of the first embodiment, each inner terminal 27 is displaced by 90 degrees with respect to the circumferential direction of the corresponding conductor bar group 62 from the outer terminal 26 of the corresponding conductor bar 64. Each coupling portion 65 is curved to form an involute curve when viewed along the center axis of the corresponding conductor bar group 62.

Figure 7:
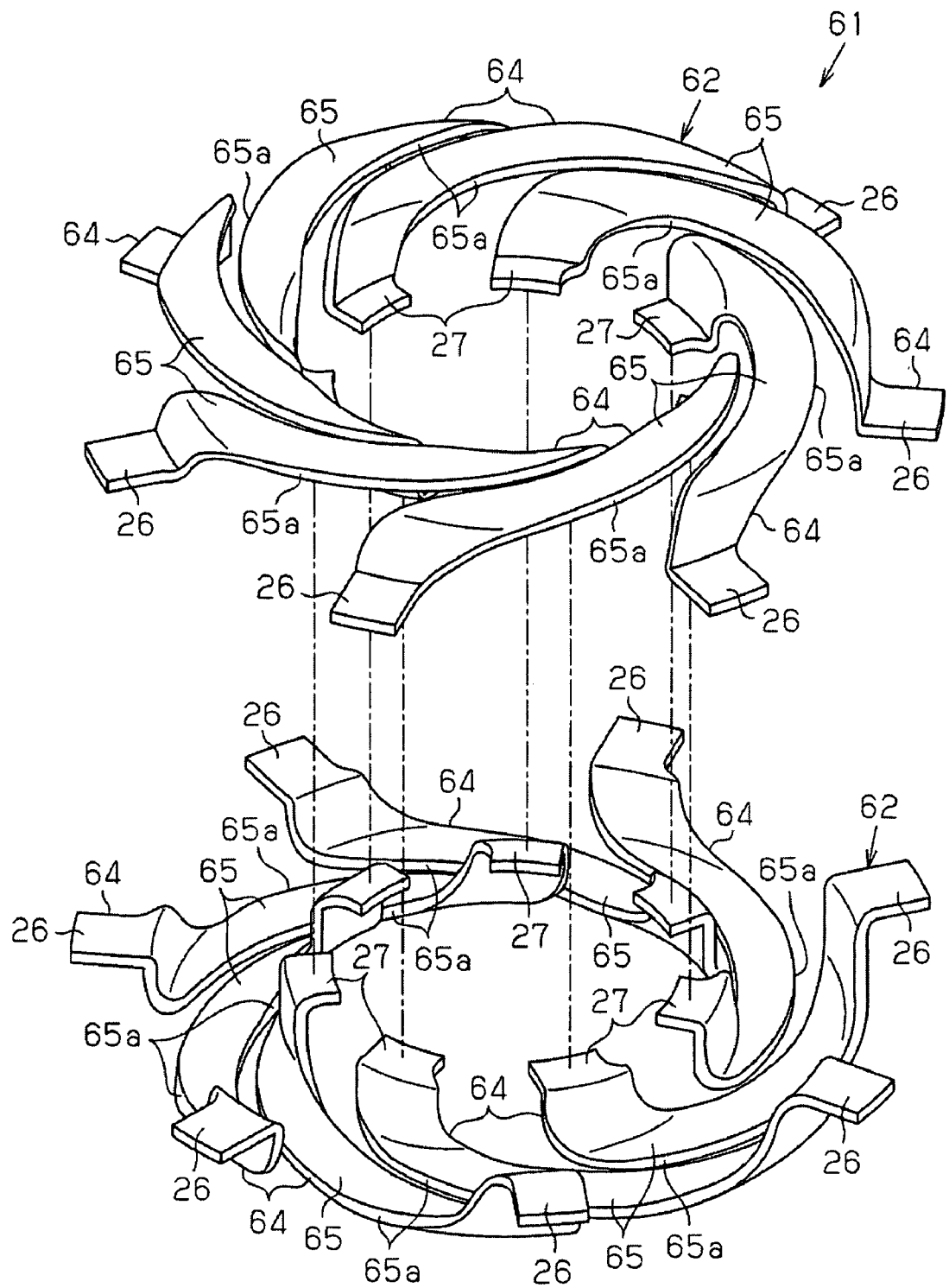
FIG. 7 is an exploded perspective view showing the bar assembly shown in FIG. 6.

As shown in FIG. 7, the outer terminals 26 and the inner terminals 27 of each conductor bar group 62 are arranged in a common plane, while the coupling portions 65 of each conductor group 62 are bent such that their center portions bulge in the axial direction of the bar assembly 61. The direction in which the center portions of the coupling portions 65 bulge is a direction away from the conductor bar group 62 that is different from the conductor bar group 62 to which the coupling portions 65 belong. The bend of each coupling portion 65 is formed by substantially orthogonally bending the corresponding conductor bar 64 at two positions near the boundary between the outer terminal 26 and the coupling portion 65, and substantially orthogonally bending the conductor bar 64 at two; positions near the boundary between the inner terminal 27 and the coupling portion 65. Therefore, each coupling portion 65 has a channel-like longitudinal cross-sectional shape.

Each adjacent pair of the coupling portions 65 along the circumferential direction of the corresponding conductor bar group 62 contact each other at part of their side faces 65a before the coupling portions 65 are bent, that is, when the coupling portions 65 are located in the same plane as the outer terminals 26 and the inner terminals 27. Each adjacent pair of the coupling portions 65 are separated from each other only by bending the coupling portions 65. The coupling portions 65 are wider than the coupling portions 28 according to the first embodiment, shown in FIG. 3.

As shown in FIG. 6, the first conductor bar group 62 and the second conductor bar group 62 are stacked on each other after one of the first and second; conductor bar groups 23 is inverted about the first straight line L1, such that the direction in which the center portion of each coupling portion 65 of the first conductor bar group 62 bulges and the direction in which the center portion of each coupling portion 65 of the second conductor bar group 62 bulges are opposite to each other. The stacking is executed such that each of the inner terminals 27 of the first conductor bar group 62 is aligned with the corresponding one of the inner terminals 27 of the second conductor bar group 62, and that each of the outer terminals 26 of the first conductor bar group 62 is displaced from the corresponding one of the outer terminals 26 of second conductor bar group 2 with respect to the circumferential direction of the corresponding conductor bar group 62. In the conductor bar assembly 61, which is obtained by stacking the first and second conductor bar groups 62, fourteen outer terminals 26 are arranged at equal angular intervals along the circumferential direction of the conductor bar assembly 61. Also, the direction in which the inner terminal 27 is displaced from the outer terminal 26 in each conductor bar 64 in the first conductor bar group 62 is opposite to the direction in which the inner terminals 27 is displaced from the outer terminal 26 in each conductor bar 64 in the second conductor bar group 62. Further, regarding each pair of a conductor bar 64 of the first conductor bar group 62 and a conductor bar 64 of the second conductor bar group 62, of which the inner terminals 21 are aligned with each other, the linear distance between the inner terminal 27 and the outer terminal 26 of one of the conductor bars 64 is equal to that of the other of the conductor bars 64.

A method for manufacturing the short-circuit member having the conductor bar assembly 61 of the above described configuration will now be described.

Figure 8:
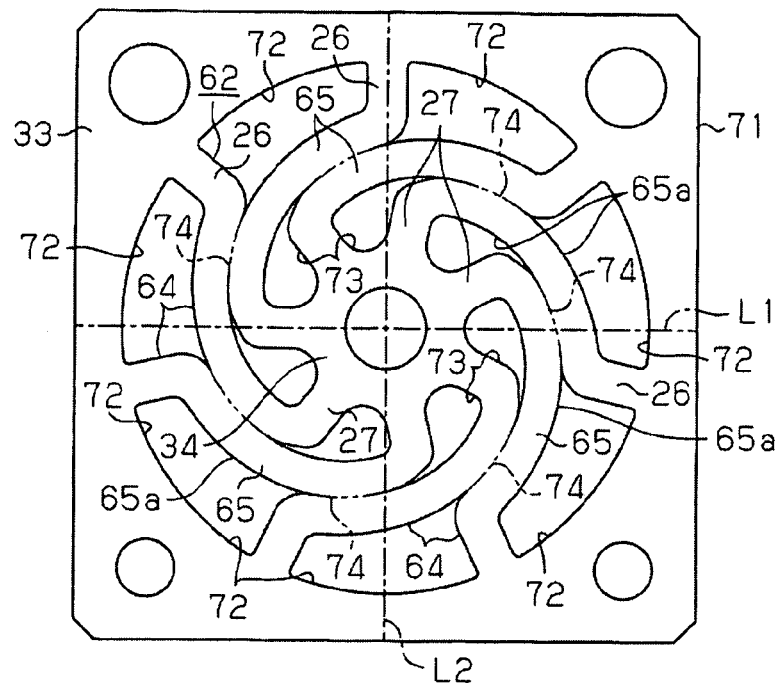
FIGS. 8, 9, 10, and 11 are diagrams showing manufacturing procedure of the conductor bar assembly shown in FIG. 6.

First, as shown in FIG. 8, each of two conductive plates 71 such as copper plates is pressed to form the conductor bar group 62 including annularly arranged seven conductor bars 64.

More specifically, annularly arranged seven outer holes 72 and annularly arranged seven inner holes 73 are formed in each plate 71 through punching. An outer terminal 26 is formed between each adjacent pair of the outer holes 72 in the circumferential direction of the outer holes 72, and an inner terminal 27 is formed between each adjacent pair of the inner holes 73 in the circumferential direction of the dinner holes 73. Next, seven cutting lines 74 are formed at positions in each plate 71 between the outer holes 72 and the inner holes 73 through pressing. In FIG. 8, the cutting lines 74 are shown by double dashed lines. Each cutting line 74 extends from one of the outer holes 72 to the corresponding inner hole 73. The cutting lines 74 divides a portion of each plate 71 located between the outer holes 72 and the inner holes 73 into annularly arranged seven pieces, thereby forming the seven coupling portions 65. The conductor bars M of the conductor bar group 62 formed in each plate 71 are connected by an outer frame 33 and an inner frame 34. Each adjacent pair of the coupling portions 65 in the circumferential direction of the corresponding conductor bar group 62 contact each other at their side faces 65a.

Figure 9:
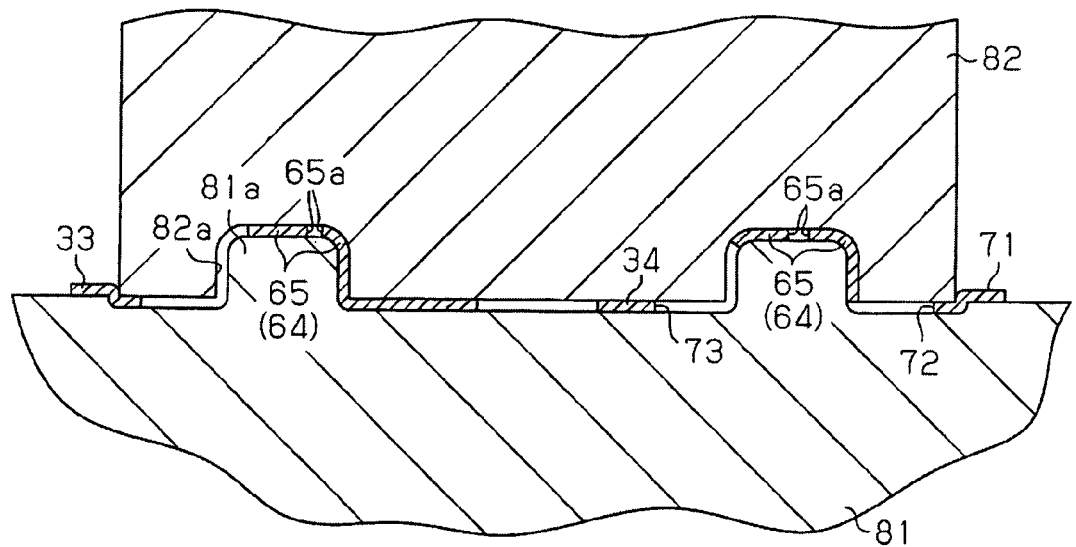

Next, each coupling portions 65 is bent such that its center portion bulges along the thickness of the plate 71. As shown in FIG. 9, the coupling portions 65 are bent by a first mold 81 having an annular projection 81a and a second mold 82 having an annular recess 82a, which corresponds to the projection 81a. The projection 81a and the recess 82a are each formed to correspond to the coupling portions 65 of the plates 71. After the plate 71 shown in FIG. 8 is placed between the first mold 81 and the second mold 82, the first mold 81 and the second mold 82 are brought closer, so that the plate 71 is held between the molds 81, 82. This bends the coupling portions 65 on the plate 71 as shown in FIG. 10, and each adjacent pair of the coupling portions 65 in the circumferential direction of the conductor bar group 62 are separated from each other.

Figure 10:
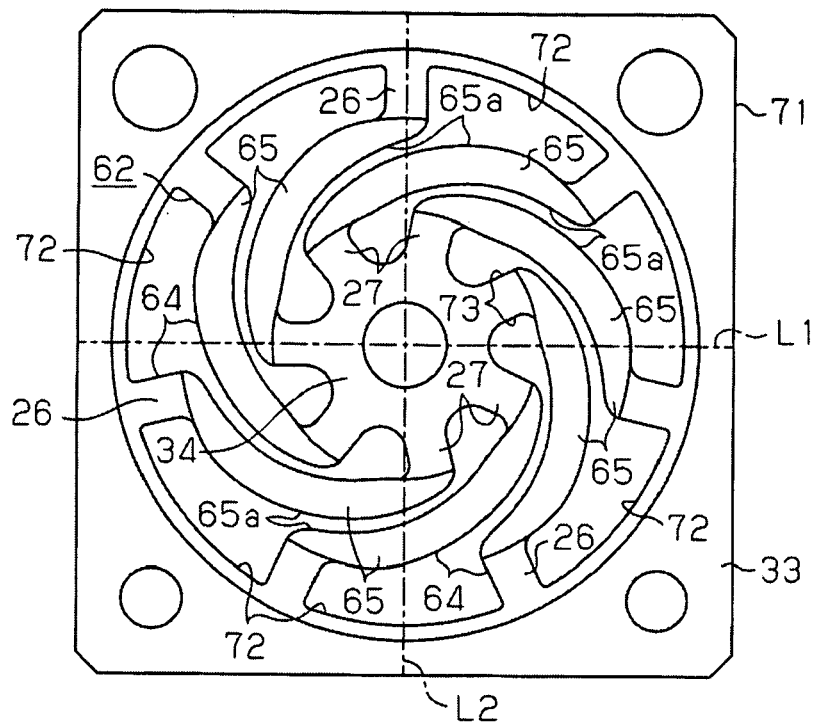

Then, the two plates 71 shown in FIG. 10 are stacked on each other. Prior to the stacking, one of the two plates 71 is inverted about; the first straight line L1 shown in FIG. 10. At the stacking, the two plates 71 are arranged such that the direction in which the center portion of each coupling portion 65 of the first conductor bar group 62 bulges and the direction in which the center portion of each coupling portion 65 in the second conductor bar group 62 bulges are opposite to each other.

Figure 11:
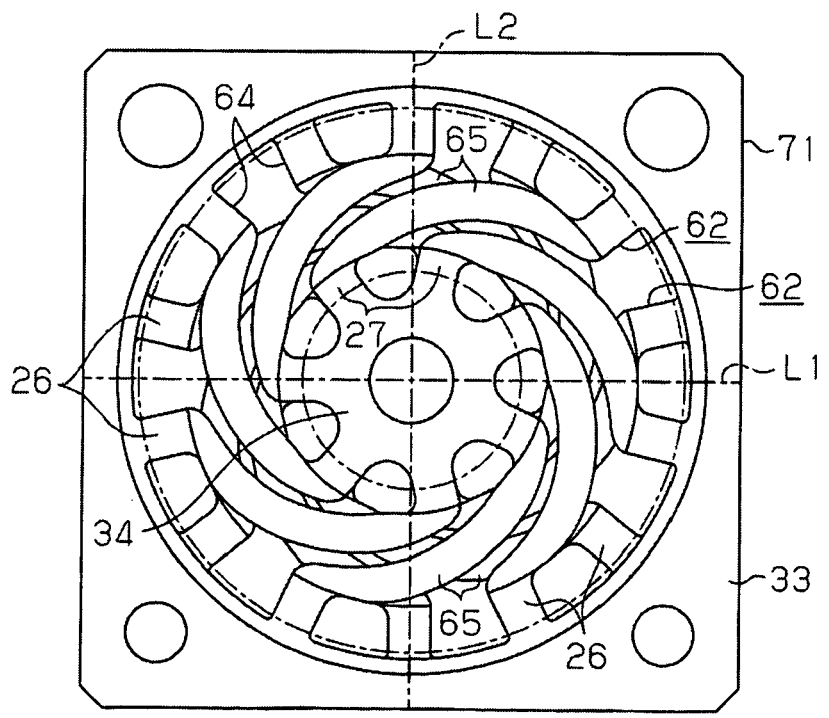

Thereafter, the aligned pairs of the inner terminals 27 of the stacked two plates 71 are joined through welding. The integrated two plates 71 are used as an insert, and the holding member 22 is insert molded as in the case of the first embodiment. Finally, the plates 71 are cut along double dashed lines in FIG. 11 to remove the outer frame 33 and the inner frame 34 of each plate 71. The short-circuit member 12 having the conductor bar assembly 61 is thus completed.

In addition to the advantages (1) to (4) of the first embodiment, the second embodiment provides the following advantages.

(1) Each pair of adjacent coupling portions 65 in the circumferential direction of the corresponding conductor bar group 62 contact each other before the coupling portions 65 are bent, and are separated from each other only when the coupling portions 65 are bent. A sufficient space is needed between each adjacent pair of the coupling portions 65 along the circumferential direction of the conductor bar group 62 to prevent the coupling portions 65 from contacting each other before the coupling portions 65 are bent. However, since there is no harm in allowing adjacent coupling portions 65 to contact before the coupling portions 65 are bent, such space is not required in the present embodiment. Therefore, the width of the coupling portion 65 of each conductor bar 64 is easily widened without changing the inner diameter or the outer diameter of each conductor bar group 62, or changing the space between adjacent outer terminals 26 in the circumferential direction of the conductor bar group 62 or the space between adjacent inner terminals 27 in the circumferential direction of the conductor bar group 62. When the width of each coupling portion 65 is increased, the cross-sectional area along the width of the coupling portion 65 is increased. This reduces the electric resistance of the coupling portion 65, and thus improves the conductivity of the connection between the segments 14 that are short-circuited by the short-circuit member 12.

(2) During the manufacture of the short-circuit member 12 according to the second embodiment, the conductor bars 64 are formed in each plate 71 by forming the cutting lines 74 in addition to the outer holes 72 and the inner holes 73. The area of sections punched out when forming the conductor bars 64 by forming the cutting lines 74 and the outer and inner holes 72, 73 in each plate 71 is less than the area of the punched out sections when forming the conductor bars 25 by forming the slits 32 in each plate 31 in the case of the first embodiment. That is, according to the second embodiment, the amount of waste produced by punching is relatively small.

(3) The pressing operation for forming the outer holes 72 and the inner hole's 73 and the pressing operation for forming the cutting lines 74 are not performed simultaneously but are separately performed on each plate 71. Compared to the case where the outer holes 72, the inner holes 73, and the cutting lines 74 are formed in each plate 71 through a simultaneous pressing operation, the amount of cutting per pressing operation is less. This reduces the frictional force between the pressing die and the plate 71, so that the conductor bars 64 are prevented from being deformed during the pressing operation.

The Above-mentioned Embodiments; may be Modified as Follows.

In the second embodiment, the outer holes 72, the inner holes 73, and the cutting lines 74 may be simultaneously formed in each plate 71 through pressing.

In the second embodiment, both of the coupling portions 65 of the first conductor bar group 62 and the coupling portions 65 of the second conductor bar group 62 are bent such that their center portions project in the axial direction of the conductor bar assembly 61. However, either of the coupling portions 65 of the first conductor bar group 62 and the coupling portions 65 of the second conductor bar group 62 may be bent such that their center portions project in the axial direction of the conductor bar assembly 61.

In the second embodiment, each coupling portion 65 has a channel-like longitudinal cross-sectional shape. However, as long as each coupling portion 65 projects at its center portion in the axial direction of the conductor bar assembly 61, the coupling portion 65 may have an arcuate or triangular longitudinal cross-sectional shape.

In the first embodiment, the coupling portions 28 are bent such that their center portion bulges along the direction of the thickness of each plate 31 at the same time as forming the seven slits 32 in the plate 31 through punching. However, the pressing operation for forming the slits in each plate 31 and the pressing operation for bending the coupling portions 28 may be performed separately.

In the first and second embodiments, integrated two plates are used as an insert in insert molding of the holding member 22. Then, the outer frames 33 and the inner frames 34 are removed. However, the holding member 22 may be insert molded after removing the outer frames and the inner frames 34.

In the first embodiment, the following configuration is applied to prevent the coupling portions 28 of the first conductor bar group 23 and the coupling portion 28 of the second conductor bar group 23 from contacting each other and being short-circuited. That is, each coupling portion 28 of the first conductor bar group 23 or each coupling portion 28 of the second conductor bar group 23 is bent such that its center portion bulges by a relatively great amount in the axial direction of the conductor bar group 23, and each coupling portions 28 of the other conductor bar group 23 is bent such that its center portion bulges by a relatively small amount in the axial direction of the conductor bar group 23. The direction in which the center portions of the coupling portions 28 with greatly bulging center portion bulge is a direction away from the conductor bar group 23 that is different from the conductor bar group 23 to which the coupling portions 28 of the greatly bulging center portions belong. The direction in which the center portions of the coupling portions 28 with slightly bulging center portion bulge is a direction toward the conductor bar group 23 that is different from the conductor bar group 23 to which the coupling portions 28 of the slightly bulging center portions belong. However, other configuration may be employed to prevent the coupling portions 28 of the first conductor bar group 23 and the coupling portions 28 of the second conductor bar group 23 from contacting each other and being short-circuited.

For example, both of the coupling portions 28 of the first conductor bar group 23 and the coupling portions 28 of the second conductor bar group 23 may be bent such that their longitudinal center portions bulge by a same amount in the axial direction of the corresponding conductor bar group 23. Also, the first conductor bar group 23 and the second conductor bar group 23 may be stacked on each other such that the direction in which the center portion of each coupling portion 28 of one of the conductive bar group 23 projects is a direction away from the other conductor bar group 23. Alternatively, the thickness of the coupling portions 28 of the first conductor bar group 23 and the second conductor bar group 23 may be less than the thicknesses of the outer terminals 26 and the inner terminals 27. Further, the first conductor bar group 23 and the second conductor bar group 23 may be stacked on each other such that the spaces between the coupling portions 28 of the first conductor bar group 23 and the coupling portions 28 of the second conductor bar group 22 are maximized. Alternatively, an insulating sheet may be provided between the coupling portions 28 of the first conductor bar group 23 and the coupling portions 28 of the second conductor bar group 23. These modifications are advantages in that the shape of the first conductor bar group 23 and the shape of the second conductor bar group 23 can be made identical.

In the first embodiment, the first conductor bar group 23 and the second conductor bar group 23 do not need to have identical shapes when viewed along the center axis of the corresponding conductor bar group 23.

In the second embodiment, the first conductor bar group 62 and the second conductor bar group 62 do not need to have identical shapes when viewed along the center axis of the corresponding conductor bar group 62.

In the first and second embodiments, the commutator 4 has fourteen segments, and each pair of the segments 14 that are spaced by 180 degrees are short-circuited by the short-circuit member 12. However, as long as the number of the segments 14 in the commutator 4 is represented by 2n (n is a positive odd number), the number of the segments 14 does not need to be limited to that shown in the first and second embodiments. When the number of the segments 14 in the commutator 4 is expressed by 2n, the number of the conductor bars 25, 64 of the conductor bar groups 23, 62 are each expressed by n.

Figure 12:
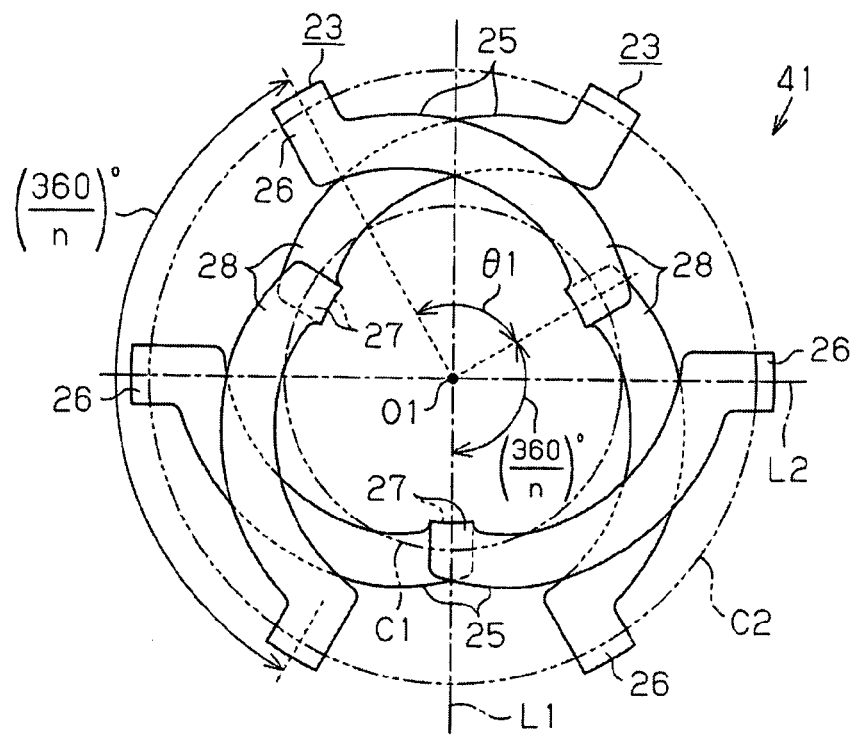
FIG. 12 is a plan view showing a conductor bar assembly according to a modified embodiment of the present invention.

For example, in the case where the commutator 4 has six segments 14, the short-circuit member 12 may have a conductor bar assembly 41 shown in FIG. 12 instead of the conductor bar assembly 21 shown in FIG. 3 or the conductor bar assembly 61 shown in FIG. 6. The conductor bar assembly 41 is formed by stacking a first conductor bar group 23 and a second conductor bar assembly 23, each having three conductor bars 25. The three conductor bars 25 of each conductor bar group 23 are arranged at equal angular intervals to form a circle. The inner terminals 27 of the conductor bars 25 are each located at a position displaced from the corresponding outer terminal 26 by 90 degrees in the circumferential direction of the conductor bar group 23. The direction in which the inner terminal 27 is displaced from the outer terminal 26 in each conductor bar 25 in the first conductor bar group 23 is opposite to the direction in which the inner terminals 27 is displaced from the outer terminal 26 in each conductor bar 25 in the second conductor bar group 23. Each of the inner terminals 27 of the first conductor par group 23 is aligned with the corresponding one of the inner terminals 27 of the second conductor bar group 23, and each of the outer terminals 26 of the first conductor bar group 23 is displaced from the corresponding one of the outer terminals 26 of second conductor bar group 23 with respect to the circumferential direction of the corresponding conductor-bar group 23.

Figure 13:
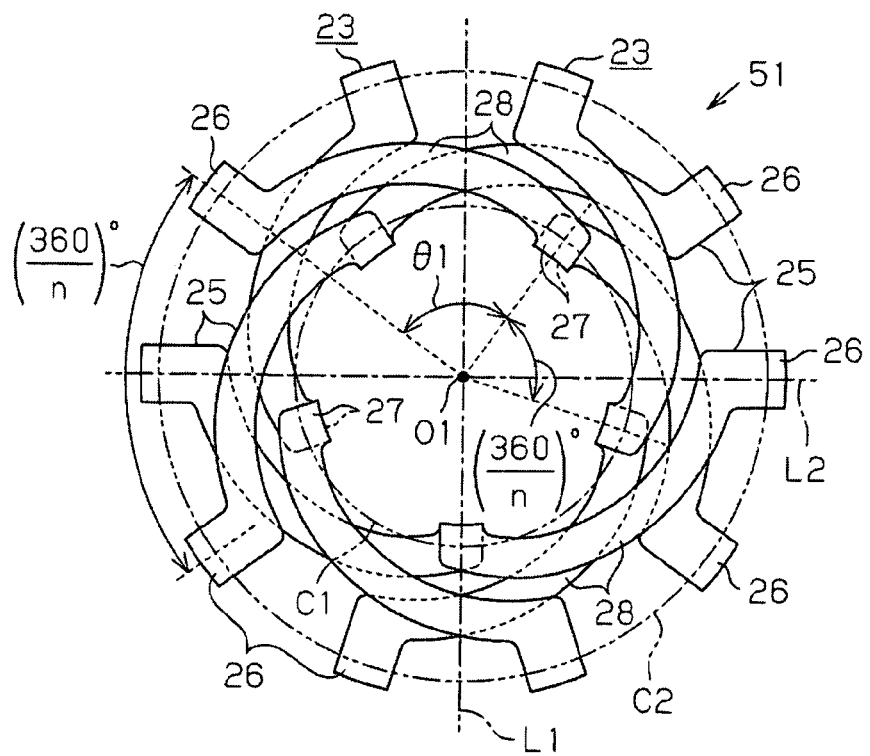
FIG. 13 is a plan view showing a conductor bar assembly according to another modified embodiment of the present invention.

Alternatively, in the case where the commutator 4 has ten segments 14, the short-circuit member 12 may have a conductor bar assembly 51 shown in FIG. 13 instead of the conductor bar assembly 21 shown in FIG. 3 or the conductor bar assembly 61 shown in FIG. 6. The conductor bar assembly 51 is formed by stacking a first conductor bar group 23 and a second conductor bar assembly 23, each having five conductor bars 25. The five conductor bars 25 of each conductor bar group 23 are arranged at equal angular intervals to form a circle. The inner terminals 27 of the conductor bars 25 are each located at a position displaced from the corresponding outer terminal 26 by 90 degrees in the circumferential direction of the conductor bar group 23. The direction in which the inner terminal 27 is displaced from the outer terminal 26 in each conductor bar 25 in the first conductor bar group 23 is opposite to the direction in which the inner terminals 27 is displaced from the outer terminal 26 in each conductor bar 25 in the second conductor bar group 23. Each of the inner terminals 27 of the first conductor bar group 23 is aligned with the corresponding one of the inner terminals 27 of the second conductor bar group 23, and each of the outer terminals 26 of the first conductor bar group 23 is displaced from the corresponding one of the outer terminals 26 of second conductor bar group 23 with respect to the circumferential direction of the corresponding conductor bar group 23.

The shape of the insulation member 13 and the shape of the holding member 22 are not limited to those described in the first and second embodiments. For example, the joining portion 13a of the insulator member 13 and the boss 22a of the holding member 22a may be omitted, and the short-circuit member 12 may be arranged at one end of the insulation member 13. Alternatively, the holding member 22 may be omitted, so that the short-circuit member 12 includes only the conductor bar assembly 21 or 61.

The invention claimed is:

1. A short-circuit member comprising a first conductor member group and a second conductor member group, each conductor member group including a plurality of conductor members that are arranged to form a circle, the number of the conductor members belonging to the first conductor member group and the number of the conductor members belonging to the second conductor member group being equal to each other and represented by n, which is an odd number, wherein each conductor member has an outer terminal located at an outer portion with respect to a radial direction of the corresponding conductor member group, an inner terminal located at an inner portion with respect to the radial direction of the corresponding conductor member group, and a coupling portion coupling the outer terminal and the inner terminal to each other, wherein the inner terminal of each conductor member is displaced from the outer terminal of the same conductor member by 90 degrees with respect to a circumferential direction of the corresponding conductor member group, wherein the first conductor member group and the second conductor member group are stacked on each other such that the direction in which the inner terminal is displaced from the outer terminal in each conductor member of the first conductor member group is opposite to the direction in which the inner terminal is displaced from the outer terminal in each conductor member of the second conductor member, and wherein each inner terminal of the first conductor member group is aligned with a corresponding one of the inner terminals of the second conductor member group, and wherein each outer terminal of the first conductor member group is displaced from any of the outer terminals of the second conductor member with respect to the circumferential direction of the first conductor member group.

2. The short-circuit member according to claim 1, wherein the inner terminals of the conductor members in each conductor member group are arranged at equal angular intervals along the circumferential direction of the conductor member group.

3. The short-circuit member according to claim 2, wherein the first conductor member group and the second conductor member group have an identical shape, wherein one of the inner terminals of the conductor member belonging to each conductor member group is located on a first straight line that passes through a center of the conductor member group, wherein one of the outer terminals of the conductor members belonging to each conductor member group is located on a second straight line that passes through the center of the conductor member group and is perpendicular to the first straight line, and wherein the first conductor member group and the second conductor member group are stacked on each other in a state where one of the first conductor member group and the second conductor member group are inverted about the first straight line.

4. The short-circuit member according to claim 1, wherein either the coupling portion of each of the conductor members belonging to the first conductor member group and the coupling portion of each of the conductor members belonging to the second conductor member group is bent such that its center portion bulges in an axial direction of the corresponding conductor member group, and wherein the direction in which the center portions bulge from the corresponding conductor member group is a direction away from the other conductor member group.

5. The short-circuit member according to claim 4, wherein each pair of the coupling portions with bulging center portions that are adjacent to each other in the circumferential direction of the corresponding conductor member group contact each other before the coupling portions are bent, and separate from each other only after the coupling portions are bent.

6. A short-circuit member comprising a first conductor member group and a second conductor member group, each conductor member group including a plurality of conductor members that are arranged to form a circle, the number of the conductor members belonging to the first conductor member group and the number of the conductor members belonging to the second conductor member group being equal to each other and represented by n, which is an odd number;
wherein each conductor member has an outer terminal located at an outer portion with respect to a radial direction of the corresponding conductor member group, an inner terminal located at an inner portion with respect to the radial direction of the corresponding conductor member group, and a coupling portion coupling the outer terminal and the inner terminal to each other, wherein the inner terminal of each conductor member is displaced from the outer terminal of the conductor member with respect to a circumferential direction of the corresponding conductor member group;
wherein the first conductor member group and the second conductor member group are stacked on each other such that the direction in which the inner terminal is displaced from the outer terminal in each conductor member of the first conductor member group is opposite to the direction in which the inner terminal is displaced from the outer terminal in each conductor member of the second conductor member;
wherein each inner terminal of the first conductor member group is aligned with a corresponding one of the inner terminals of the second conductor member group, and wherein each outer terminal of the first conductor member group is displaced from any of the outer terminals of the second conductor member with respect to the circumferential direction of the first conductor member group; and
wherein, regarding each pair of a conductor member of the first conductor member group and a conductor member of the second conductor member group, of which the inner terminals are aligned with each other, the linear distance between the inner terminal and the outer terminal of one of the conductor members is equal to that of the other of the conductor members.

7. A commutator comprising: segments the number of which is represented by 2n, n being a positive integer; and a short-circuit member having a first conductor member group and a second conductor member group, each conductor member group including a plurality of conductor members that are arranged to form a circle, the number of the conductor members belonging to the first conductor member group and the number of the conductor members belonging to the second conductor member group being equal to each other and represented by n, which is an odd number;
wherein each conductor member has an outer terminal located at an outer portion with respect to a radial direction of the corresponding conductor member group, an inner terminal located at an inner portion with respect to the radial direction of the corresponding conductor member group, and a coupling portion coupling the outer terminal and the inner terminal to each other, wherein the inner terminal of each conductor member is displaced from the outer terminal of the same conductor member by 90 degrees with respect to a circumferential direction of the corresponding conductor member group, wherein the outer terminal of each conductor member is connected to the corresponding one of the segments;
wherein the first conductor member group and the second conductor member group are stacked on each other such that the direction in which the inner terminal is displaced from the outer terminal in each conductor member of the first conductor member group is opposite to the direction in which the inner terminal is displaced from the outer terminal in each conductor member of the second conductor member; and
wherein each inner terminal of the first conductor member group is aligned with a corresponding one of the inner terminals of the second conductor member group, and wherein each outer terminal of the first conductor member group is displaced from any of the outer terminals of the second conductor member with respect to the circumferential direction of the first conductor member group.

8. The commutator according to claim 7, wherein the inner terminals of the conductor members in each conductor member group are arranged at equal angular intervals along the circumferential direction of the conductor member group.

9. The commutator according to claim 8, wherein the first conductor member group and the second conductor member group have an identical shape, wherein one of the inner terminals of the conductor member belonging to each conductor member group is located on a first straight line that passes through a center of the conductor member group, wherein one of the outer terminals of the conductor members belonging to each conductor member group is located on a second straight line that passes through the center of the conductor member group and is perpendicular to the first straight line, and wherein the first conductor member group and the second conductor member group are stacked on each other in a state where one of the first conductor member group and the second conductor member group are inverted about the first straight line.

10. The commutator according to claim 7, wherein either the coupling portion of each of the conductor members belonging to the first conductor member group and the coupling portion of each of the conductor members belonging to the second conductor member group is bent such that its center portion bulges in an axial direction of the corresponding conductor member group, and wherein the direction in which the center portions bulge from the corresponding conductor member group is a direction away from the other conductor member group.

11. The commutator according to claim 10, wherein each pair of the coupling portions with bulging center portions that are adjacent to each other in the circumferential direction of the corresponding conductor member group contact each other before the coupling portions are bent, and separate from each other only after the coupling portions are bent.

12. An armature comprising:
a rotary shaft;
an armature core fixed about the rotary shaft, a coil being wound about the armature core; and
a commutator that is fixed about the rotary shaft, segments of the commutator are electrically connected to the coil;
wherein the commutator includes:
said segments the number of which is represented by 2n, n being a positive integer, and
a short-circuit member having a first conductor member group and a second conductor member group, each conductor member group including a plurality of conductor members that are arranged to form a circle, the number of the conductor members belonging to the first conductor member group and the number of the conductor members belonging to the second conductor member group being equal to each other and represented by n, which is an odd number,
wherein each conductor member has an outer terminal located at an outer portion with respect to a radial direction of the corresponding conductor member group, an inner terminal located at an inner portion with respect to the radial direction of the corresponding conductor member group, and a coupling portion coupling the outer terminal and the inner terminal to each other,
wherein the inner terminal of each conductor member is displaced from the outer terminal of the same conductor member by 90 degrees with respect, to a circumferential direction of the corresponding conductor member group, wherein the outer terminal of each conductor member is connected to the corresponding one of the segments,
wherein the first conductor member group and the second conductor member group are stacked on each other such that the direction in which the inner terminal is displaced from the outer terminal in each conductor member of the first conductor member group is opposite to the direction in which the inner terminal is displaced from the outer terminal in each conductor member of the second conductor member, and
wherein each inner terminal of the first conductor member group is aligned with a corresponding one of the inner terminals of the second conductor member group, and wherein each outer terminal of the first conductor member group is displaced from any of the outer terminals of the second conductor member with respect to the circumferential direction of the first conductor member group.

* * * * *